United States Patent
Cocural et al.

(10) Patent No.: US 9,346,229 B2
(45) Date of Patent: May 24, 2016

(54) MOLD ELEMENT FOR VULCANIZING A TIRE TREAD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Jean-Louis Cocural, Clermont-Ferrand (FR); Christian Gomet, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 0 days.

(21) Appl. No.: 14/418,140

(22) PCT Filed: Jul. 8, 2013

(86) PCT No.: PCT/EP2013/064381
§ 371 (c)(1),
(2) Date: Jan. 29, 2015

(87) PCT Pub. No.: WO2014/019811
PCT Pub. Date: Feb. 6, 2014

(65) Prior Publication Data
US 2015/0251367 A1    Sep. 10, 2015

(30) Foreign Application Priority Data
Jul. 31, 2012    (FR) ...................... 12 57398

(51) Int. Cl.
*B29D 30/06*    (2006.01)
*B29C 33/42*    (2006.01)
*B29D 30/66*    (2006.01)
*B29K 101/12*    (2006.01)

(52) U.S. Cl.
CPC .......... *B29D 30/0606* (2013.01); *B29C 33/424* (2013.01); *B29D 2030/0612* (2013.01); *B29D2030/0613* (2013.01); *B29D 2030/0616* (2013.01); *B29D 2030/662* (2013.01); *B29K 2101/12* (2013.01)

(58) Field of Classification Search
CPC .......... B29D 30/0606; B29D 30/0662; B29D 2030/0612; B29D 2030/0616; B29D 2030/662; B29C 33/424
See application file for complete search history.

(56) References Cited

U.S. PATENT DOCUMENTS 2,296,016 A * 9/1942 Bostwick .............. B29C 33/424
264/293
2,770,013 A * 11/1956 Crooker ............. B29D 30/0606
425/123

(Continued)

FOREIGN PATENT DOCUMENTS

EP        1987932      1/2011
GB        1075312      7/1967

OTHER PUBLICATIONS

International Search Report for PCT/EP2013/064381 dated Sep. 16, 2013.

*Primary Examiner* — James MacKey
(74) *Attorney, Agent, or Firm* — Dickinson Wright PLLC

(57) ABSTRACT

A mold element for vulcanizing all or part of a tire tread intended to accept studs for driving on ice. The mold element comprises a molding surface able to mold all or part of the tread surface of this tread. The mold element comprises an insert added into the mold element. The insert comprises an insert body intended to be fixed into the mold element, a rod intended for molding into the tread a cavity that is capable of accepting a stud, this rod being fixed removably to the insert body, marking means able to mold a pattern on the tread near the stud. The marking means are fixed removably to the insert body by fixing means.

14 Claims, 5 Drawing Sheets

(56) References Cited

U.S. PATENT DOCUMENTS

| | | |
|---|---|---|
| 3,327,570 A | 6/1967 | McClarran |
| 5,800,649 A * | 9/1998 | Eromaki ................ B29D 30/66 156/114 |
| 7,338,571 B2 * | 3/2008 | Brivio .................... B29D 30/66 152/210 |
| 8,313,679 B2 * | 11/2012 | Guichon ............ B29D 30/0606 264/219 |
| 2008/0277038 A1 | 11/2008 | Guichon et al. |

\* cited by examiner

MOLD ELEMENT FOR VULCANIZING A TIRE TREAD

This application is a 371 national phase entry of PCT/EP2013/064381, filed 8 Jul. 2013, this claims benefit of French Patent Application No. 1257398, filed 31 Jul. 2012, the entire contents of which are incorporated herein by reference for all purposes.

BACKGROUND

1. Field

The present disclosure relates to the field of the manufacture of a mold for vulcanizing a tire tread intended to accept studs for driving on ice. More specifically, the disclosure relates to a mold element comprising an insert and to a method of producing such a mold element.

2. Description of Related Art

Document EP1987932 discloses a method for producing a mold for a studded tire. That mold comprises a molding surface able to mold a tread surface of the tire tread. The method for producing the mold involves a step of placing an insert in a housing in the mold. This insert comprises an insert body and a rod fixed into this body, this rod being intended to mold in the tread a cavity capable of accepting a stud.

In document EP 1987932, marking is formed integrally with a surface of the body of the insert. This marking allows a pattern to be molded on the tread surface of the tread near the stud. The purpose of this pattern is to meet specific requirements associated with aesthetical or functional considerations, or with the displaying of information, such as, for example, indicating the references of the stud to be used with that tire.

In document EP1987932, the insert body is screwed into a housing present in the mold and the rod is fixed to this insert body, likewise by screwing. Now, to manufacture various ranges of tires, it is possible to need to resort to different types of stud with different dimensions, but still with the wish to use the same mold. Thus, each time there is a change in stud type, it is necessary to change the rod of the insert in order to adapt the cavity molded in the tire, by this rod, to suit the desired dimensions for the stud. It may also prove necessary to replace the marking means that mold the references of the stud to be used with the range of tires in question, in addition to changing the rod of the insert. Because the marking means are secured to the insert, changing these marking means necessarily involves dismantling the insert entirely. Now, the successive operations of assembling and disassembling the insert in relation to a housing in the mold may ultimately damage this housing, making it more difficult, or even impossible, to fit a new insert into the housing. When that happens, it then becomes necessary to change the part of the mold that comprises this damaged housing, and this in time may represent a not insignificant cost.

There is therefore a need to make it easier to prepare a mold able to mold a tire intended to accept studs, while at the same time limiting the risks of damaging this mold during this preparation step.

DEFINITIONS

A "tire" means all types of elastic tire case, whether or not subjected to an internal pressure.

The "tread" of a tire means a quantity of rubbery material delimited by lateral surfaces and by two main surfaces, one of which is intended to come into contact with a road surface as the tire drives along.

The "tread surface" of a tread here means all of the points of the tread that come into contact with the ground when the tire, inflated to its reference pressure and without studs, is driving along this ground. The reference inflation pressure is defined under the conditions of use of the tire, which conditions are specified notably by the E.T.R.T.O. standard.

A "cut" in a tread means the space delimited by walls of material facing one another and distant from one another by a non-zero distance.

A "sipe" means a cut in which the distance between the walls of material is suited to allowing the opposing walls that delimit the said sipe to come at least partially into contact with one another as the sipe enters the contact patch in which the tire is in contact with the ground.

A "groove" means a cut in which the distance between the walls of material is such that these walls cannot come into contact with one another under normal running conditions.

A "mold" means a collection of separate mold elements which, when brought relatively closer together, are able to delimit a toroidal molding space.

The "molding surface" of a mold means the internal surface of the mold delimiting the toroidal molding space.

A "sipe blade" means an element in the form of a thin rigid partition, generally made of metal, the height of which corresponds to the depth of the sipe that is to be molded in the tread, and the length of which corresponds to the length of this sipe. The sipe blade may have a wavy, straight or even more complex shape, depending on the type of performance the tire is desired to have.

A "thermoplastic material" means a material which is in a solid state at ambient temperature and which melts when a sufficient quantity of heat is applied to it.

SUMMARY

An embodiment of the invention relates to a mold element for vulcanizing all or part of a tire tread intended to accept studs for driving on ice. The mold element comprises a molding surface able to mold all or part of the tread surface of the tread. The mold element comprises an insert added into this mold element. The insert comprises an insert body intended to be fixed into the mold element, a rod intended for molding into the tread a cavity that is capable of accepting a stud, this rod being fixed removably to the insert body. The insert also comprises marking means able to mold a pattern on the tread near the stud. These marking means are fixed removably to the insert body by fixing means.

By virtue of an embodiment of the invention it is possible to dismantle the marking means by acting on the fixing means without the need to remove the insert in its entirety. In this way, the risk of damage to the housing that accepts the insert is limited and the mold is thus assured a longer life.

In one preferred embodiment, the securing means comprise a limit stop secured to the rod.

In the insert, the marking means are pressed firmly against the insert body by the limit stop secured to the rod. When there is a desire to dismantle the rod, the marking means are at the same time freed with respect to the insert body. This makes the operations of fitting and removing the rod-marking means assembly relative to the mold easier.

In an alternative form of embodiment, the mold element comprises sipe blades intended to mold sipes in the tread surface of the tread. The said sipe blades are evenly distributed and project from the molding surface of the mold element. A plurality of these sipe blades is interrupted in the region of the insert. The protrusion belonging to the marking means has the shape of a portion of a sipe blade, this portion at least partially extending one of the sipe blades that is interrupted in the region of the insert.

The invention, in various embodiments, thus makes it possible to maintain a high void ratio even near the stud. This then improves the grip of the tire on the ice.

In an alternative form of embodiment, the protrusion comprises a distal end of the marking surface, this end forming a widening relative to the rest of the protrusion.

When driving on icy ground, the studs of a studded tire scratch the ice creating additional force. During this scratching, chips of ice are generated. These chips of ice form a layer of ice between the tread surface of the tire and the surface of the ice and this impairs the grip performance of the tire on ice. Documents WO 2009/147046 and WO 2009/147047 disclose the production of grooves or cavities in the tread near the studs in order to store these chips of ice. The invention proposes producing these storage zones in the tread in a simple and practical manner by making provision to widen the ends of the protrusions belonging to the marking means.

In an alternative form of embodiment, the marking means comprise an opening through which the rod of the insert can pass, this opening having a maximum dimension DO. The position of the protrusion and the dimensions of this protrusion are determined so that the volume of protrusion present in a radius comprised between D/2 and D0/2+2 mm around the opening, is less than or equal to 20 mm$^3$, and the volume of protrusion present in a radius comprised between D0/2+2 mm and D0/2+4 mm around the opening, is greater than or equal to 60 mm3 and less than or equal to 100 mm$^3$.

In this way, the mold element makes it possible to mold tires that exhibit a better compromise between the level of grip on ice and the retention of the studs in use. Specifically, the protrusion 15 is able to mold a certain void volume in the tread. This void volume surrounds a volume of rubber which itself surrounds a stud when the stud is fitted into the tread. By positioning and dimensioning the protrusions 15 in such a way as to have a void volume limited between D0/2 and D0/2+2mm around the stud firm anchorage of this stud in the tread is maintained. In addition, with the presence of a large void volume between D/2+2 mm and D/2+4 mm around the stud, it is possible to ensure that a large quantity of ice chips can be stored in the tread and be so at a sufficiently small distance away from the stud.

In an alternative form of embodiment, the maximum height Hmax of the protrusion(s) is less than or equal to HA/2, where HA is the height of the rod when this rod is placed in the insert.

In an alternative form of embodiment, the marking means comprise a set of protrusions which globally form a ring around the rod.

The space there is between the protrusions allows bridges of rubber to be molded into the tread between the volume of rubber delimited by the cavity and the void volume, and the rest of the tread. This then improves the anchorage of the stud in the tread.

In an alternative form of embodiment, the marking surface comprises a plurality of holes uniformly distributed over this marking surface at a density at least equal to 5 holes per square millimetre (mm$^2$), the cross section of the holes being comprised between 0.003 mm$^2$ and 0.06 mm$^2$.

These holes allow a plurality of strands to be molded on the tread around the stud. This makes it possible to provide a more black appearance in a zone around the stud, as compared with the rest of the tread, improving the overall aesthetic look of the tire.

In an alternative form of embodiment the marking surface comprises a plurality of striations extending into the depth of the marking means, these striations being evenly distributed on the marking surface at a spacing at most equal to 0.5 mm, the striations having a width comprised between 0.03 mm and 0.5 mm.

These striations allow a plurality of strips to be molded on the tread around the stud. This makes it possible to provide a more black appearance in a zone near the stud, as compared with the rest of the tread, improving the overall aesthetic look of the tire.

Another subject of the invention relates to a method for producing a mold element for vulcanizing all or part of a tire tread intended to accept studs for driving on ice. The mold element comprises a molding surface able to mold all or part of the tread surface of this tread. The method comprises a step of fixing an insert body into the mold element, the said insert body being able to accept a rod intended to mold in the tread a cavity for accommodating a stud. The insert comprises removable marking means able to mold a pattern on the tread surface of the tread near the stud, the method comprises a step of fixing these marking means to the insert body.

The mold element comprises sipe blades intended to mold sipes in the tread surface of the tread, these sipe blades being evenly distributed and projecting from the molding surface of the mold element, a plurality of these sipe blades being interrupted in the region of the insert body. The marking means comprise a marking surface that is planar overall and at least one protrusion projecting from this marking surface, this protrusion having the shape of a sipe blade portion. In an alternative form of embodiment, the method comprises an additional step of positioning the protrusion relative to the mold element in such a way that this protrusion at least partially extends one of the sipe blades that is interrupted in the region of the insert body.

In an alternative form of embodiment the method comprises, prior to the step of fixing the insert body, a step of producing a housing intended to accept the insert body by removing material in a zone of the mold element comprising sipe blades, the production of this housing involving the removal of all or part of these sipe blades. Prior to the step of producing this housing, a thermoplastic material is applied to the molding surface of the mold element between the sipe blades of the zone of the mold element. This thermoplastic material is able to harden as it cools so as to make the sipe blades more rigid in order to make them easier to remove in full or in part when producing the housing.

Another subject of the invention relates to a mold comprising a plurality of mold elements as described hereinabove.

BRIEF DESCRIPTION OF THE DRAWINGS

Other features and advantages of embodiments of the invention will become apparent from the following description, given by way of nonlimiting example, with reference to the attached drawings in which.

DETAILED DESCRIPTION OF SPECIFIC EMBODIMENTS

In the description that follows, elements that are substantially identical or similar will be denoted by identical references.

Figure 1:
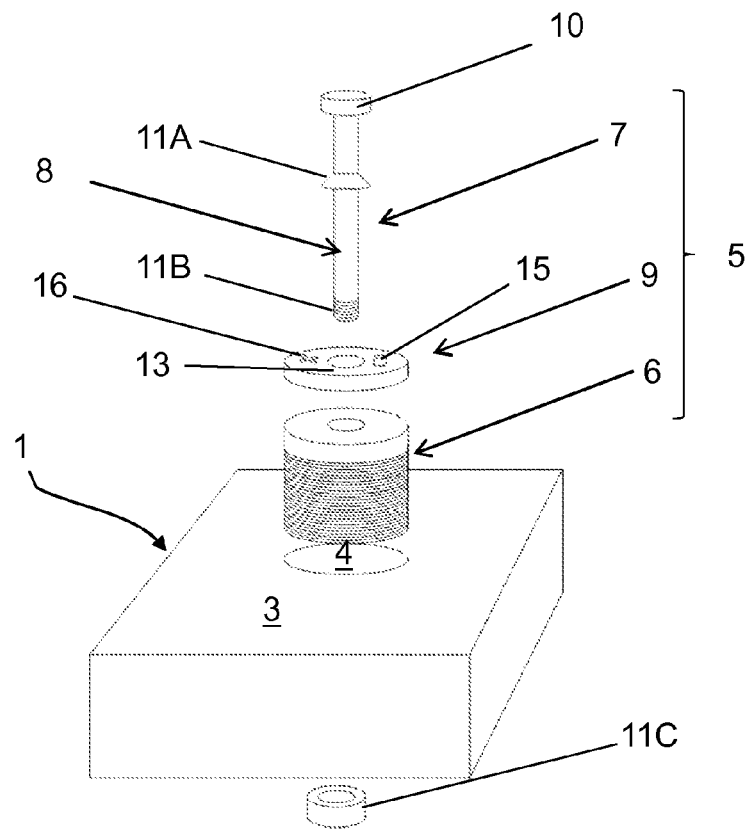
FIG. 1 schematically depicts a perspective view of an insert intended to be fixed into a mold element.

FIG. 1 depicts a perspective view of an insert 5 according to an embodiment of the invention, intended to be fixed into a mold element 1.

The insert 5 comprises an insert body 6, a rod 7, marking means 9 and fixing means 11A, 11B, 11C.

The insert body 6 is intended to be fixed into a housing 4 of the mold element. For this purpose, the insert body 6 comprises a screw thread extending over an external surface of this body.

The insert body 6 is able to accept the rod 7. This rod comprises a body 8, a head 10 and a screw thread 11B. The rod also comprises a limit stop 11A. Marking means 9 are placed between the limit stop 11A and the insert body 6. These marking means comprise a marking surface 13 which here is planar overall, and means 15 projecting from this marking surface 13 and/or means 16 set back from this marking surface 13. The projecting means 15 form protrusions able to mold a recess in the tread. The means 16 are recessed from the marking surface 13. These means 16 in this instance take the form of the letter X and are able to mold that letter in relief projecting from the tread surface of the tread. Thus, using the projecting means 15 and/or the recess means 16, it is possible to mold a particular pattern near the stud in order to improve the aesthetic look of the tire, improve its functionalities, or present information such as the reference of the stud to be used with that tire.

Figure 2:
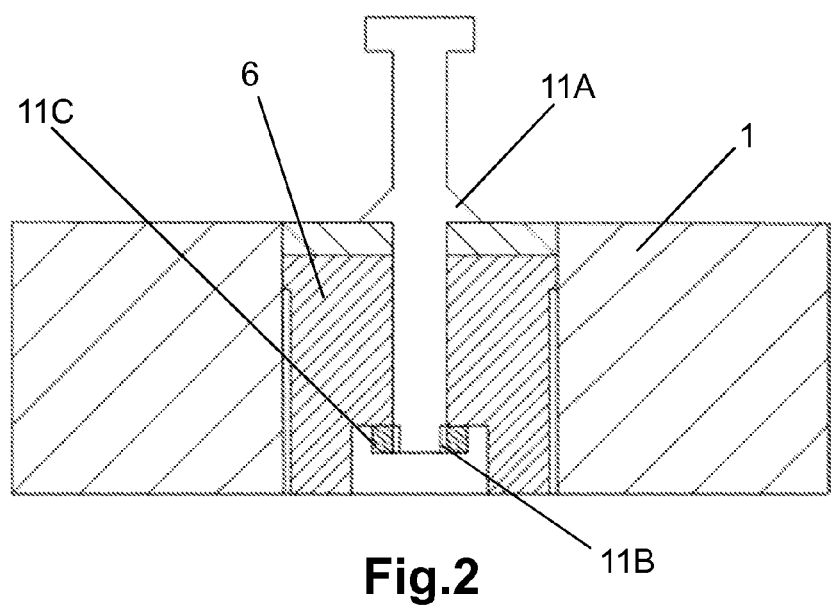
FIG. 2 depicts a view in cross section of the insert of FIG. 1 when this insert is fixed into the mold element.

FIG. 2 depicts a view in cross section of the insert of FIG. 1 when this insert is fixed into the mold element 1.

In this figure, the marking means 9 are pressed firmly against the insert body 6 and are held in this position by the combined action of the limit stop 11A, the screw thread 11B and the nut 11C.

Figure 3:
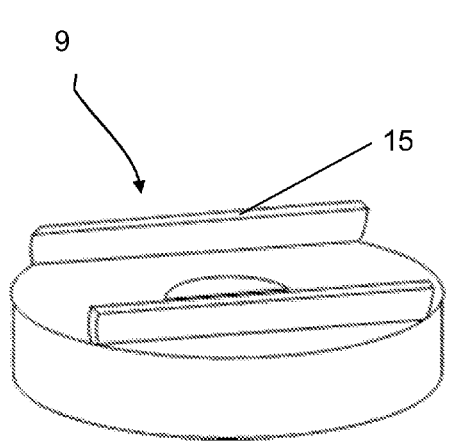
FIG. 3 depicts a perspective view of marking means of the insert of FIG. 1 according to a second embodiment of the invention.

FIG. 3 depicts a perspective view of the marking means 9 according to a second embodiment. In this second embodiment, the marking means 9 comprise two protrusions 15. These protrusions have the shape of sipe blade portions and are thus able to extend sipe blades 17 projecting from the molding surface 3 of the mold element 1, as has been depicted in FIG. 4.

Figure 5:
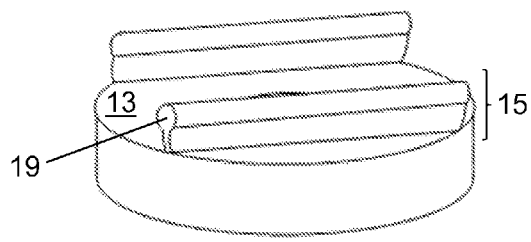
FIG. 5 depicts a perspective view of the marking means of the insert of FIG. 1, according to a third embodiment of the invention.

FIG. 5 shows a perspective view of the marking means 9 according to a third embodiment.

In this third embodiment, each protrusion 15 comprises a widening 19 at one end. Thus, it is possible to mold ice chip storage passages in the tread of the tire. These ice chips are then removed from the tread during running.

Figure 6:
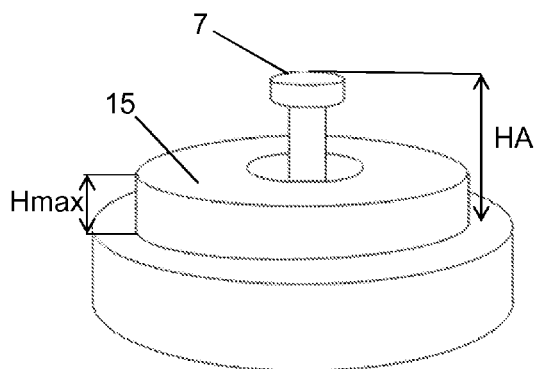
FIG. 6 depicts a perspective view of the marking means of the insert of FIG. 1, according to a fourth embodiment of the invention.

FIG. 6 shows a perspective view of the marking means 9 according to a fourth embodiment. In this embodiment, a protrusion 15 completely surrounds the rod 7 of the insert. This protrusion forms a hollow cylinder the height Hmax of which is less than or equal to HA/2 where HA is the height of the rod 7.

Figure 7:
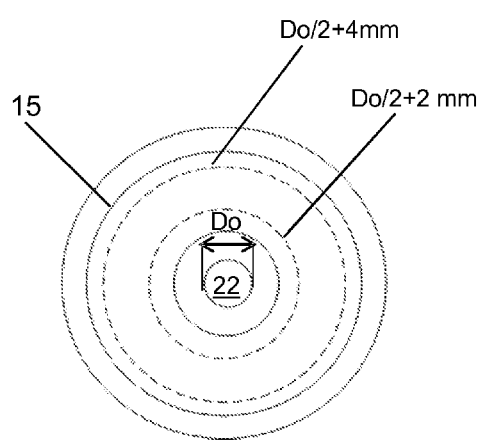
FIG. 7 depicts a view from above of the marking means of FIG. 6.

FIG. 7 shows a view from above of the marking means of FIG. 6. The marking means comprise an opening 22 through which the rod 7 of the insert can pass. This opening in this instance has a circular shape and has a maximum dimension DO corresponding to the diameter of this shape. The position of the protrusion on the marking means and the dimensions of this protrusion are determined so that the volume of the protrusion 15 present in a radius comprised between D0/2 and D0/2+2 mm around the opening 22 is less than or equal to 20 mm$^3$ and the volume of the protrusion 15 present in a radius comprised between D0/2+2 mm and D0/2+4 mm around the opening is greater than or equal to 60 mm3 and less than or equal to 100 mm3.

In this way, the mold element makes it possible to mold tires that exhibit a better compromise between the level of grip on ice and the retention of the studs in use. Specifically, the protrusion 15 is able to mold a certain void volume in the tread. This void volume surrounds a volume of rubber which itself surrounds a stud when the stud is fitted into the tread. By positioning and dimensioning the protrusions 15 in such a way as to have a void volume limited between D0/2 and D0/2+2 mm, the void volume around the stud is limited. There is therefore enough volume of rubber between the void volume and the stud to anchor this stud firmly into the tread. In addition, with the presence of a large void volume between D0/2+2 mm and D0/2+4 mm, it is possible to ensure that a large quantity of ice chips can be stored in the tread and be so at a sufficiently small distance away from the stud.

Figure 8:
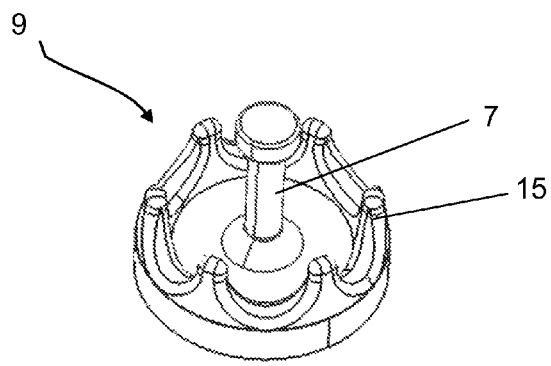
FIG. 8 depicts a perspective view of the marking means of the insert of FIG. 1, according to a fifth embodiment of the invention.

FIG. 8 shows a perspective view of the marking means 9 according to a fifth embodiment. In this embodiment, a set of protrusions 34 globally forms a ring around the rod 7. In this way, it is possible to mold bridges of rubber in the tread between the volume of rubber as described hereinabove and the rest of the tread. This then improves the anchorage of the stud into the tread.

Figure 9:
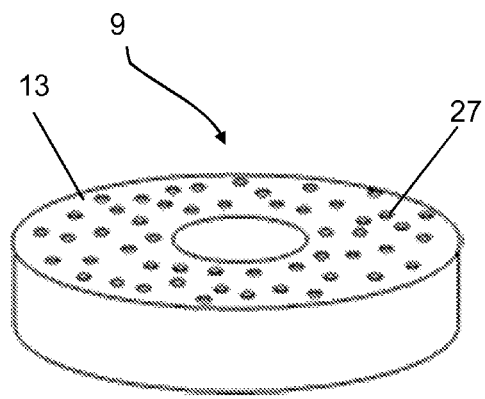
FIG. 9 depicts a perspective view of the marking means of the insert of FIG. 1, according to a sixth embodiment of the invention.

FIG. 9 shows a perspective view of the marking means 9 according to a sixth embodiment. In this embodiment, the marking surface 13 comprises a plurality of holes 27 evenly distributed at a density at least equal to 5 holes per square millimetre (mm$^2$). The cross section of the holes is comprised between 0.003 mm$^2$ and 0.06 mm$^2$. It is thus possible to mold a texture of the velour type giving a more black appearance around the stud by comparison with the rest of the tread. In order to improve the contrast still further, it is possible to reduce the cross section of the holes in their depth. The holes may, for example, have a frustoconical shape.

Figure 10:
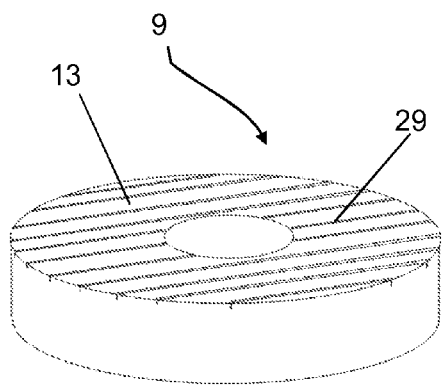
FIG. 10 depicts a perspective view of the making means of the insert of FIG. 1, according to a seventh embodiment of the invention.

FIG. 10 shows a perspective view of the marking means 9 according to a seventh embodiment. In this embodiment, the marking surface 13 comprises a plurality of protruding sipe blades 29. These sipe blades are evenly distributed on the marking surface at a spacing at most equal to 0.5 mm, these sipe blades having a width comprised between 0.03 mm and 0.5 mm. It is thus possible to mold a texture of the velour type giving a more black appearance around the stud in comparison with the rest of the tread.

FIGS. 11 to 16 illustrate various steps in a method of producing a mold element according to the invention.

Figure 11:
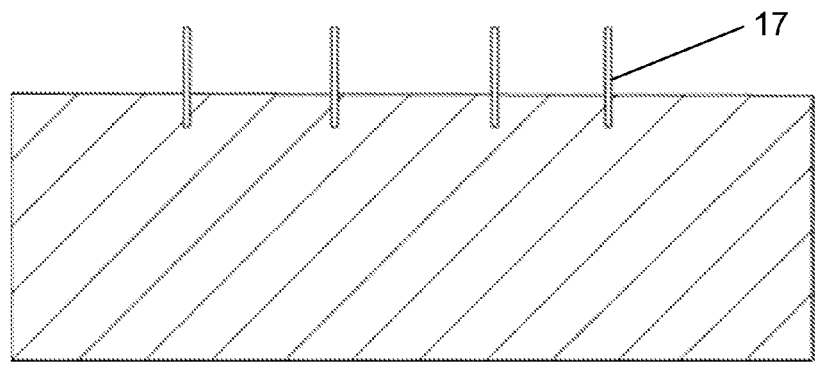
FIG. 11 depicts a view in cross section of a mold element without an insert, comprising a plurality of sipe blades.

More specifically, FIG. 11 depicts a basic mold element without an insert. This basic element comprises a plurality of sipe blades 17.

Figure 12:
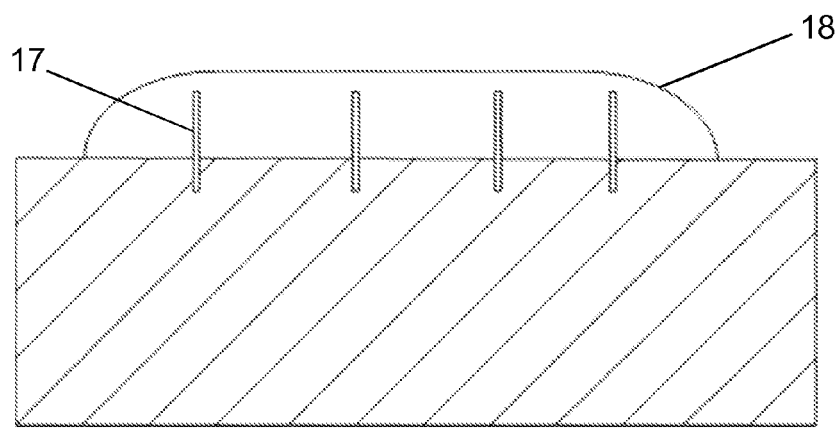
FIG. 12 depicts a first step in the production of a mold element according to the invention from the mold element of FIG. 11.

FIG. 12 depicts a step in the method whereby a thermoplastic material 18 is applied to a zone of the mold element between sipe blades 17. This thermoplastic material is, for example, a low-melting-point alloy based on tin and bismuth, such as Cerrocast®. This material allows the sipe blades 17 to be made fully or partially more rigid.

Figure 13:
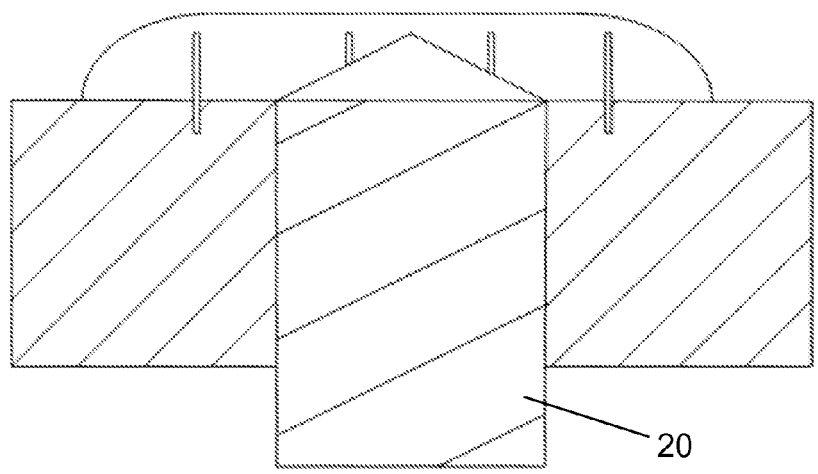
FIG. 13 depicts a second step in the production of the mold element that follows the step of FIG. 12.

FIG. 13 depicts a step in the method whereby a housing for the insert is formed during an operation of drilling using a drill bit 20. This drill bit removes material from the mold element, thermoplastic material and bits of the sipe blades contained in the drilling zone.

In an additional step (not depicted) a screw thread is machined inside the housing formed by the drill bit, so that the insert body of FIG. 1 can be fixed into it.

In another step (again not depicted), the thermoplastic material 18 remaining on the mold element is removed by applying a sufficient quantity of heat to cause it to melt.

Figure 14:
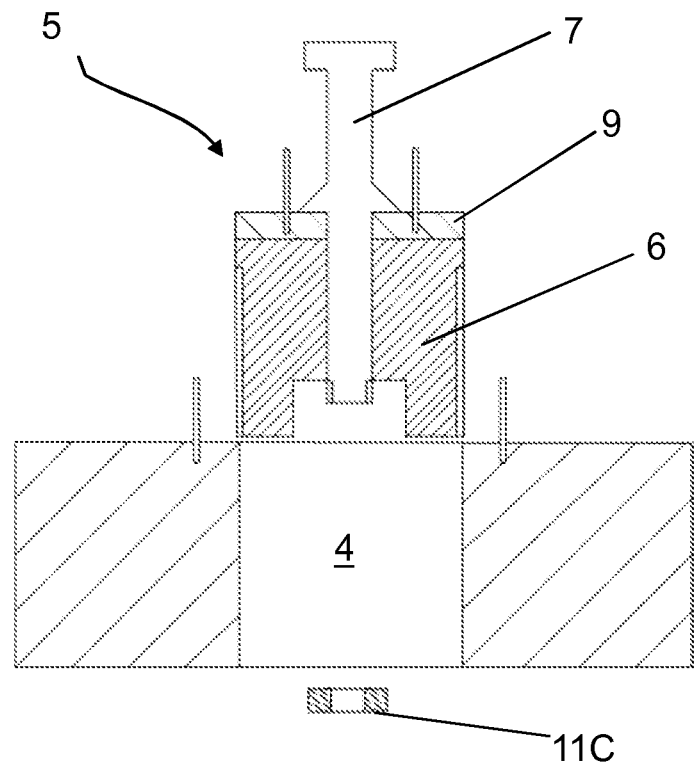
FIG. 14 depicts a step in which the insert of FIG. 1 is placed in the mold element.

FIG. 14 depicts a step in the method whereby the insert 5 is placed into the housing 4.

Figure 4:
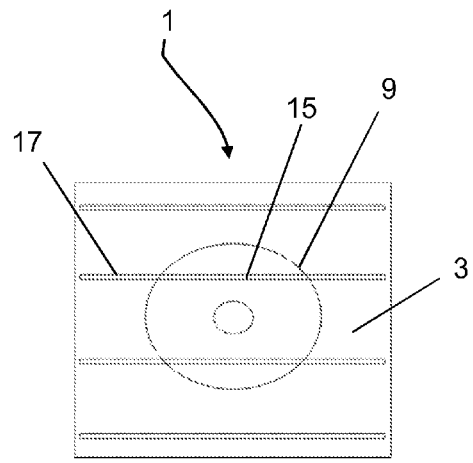
FIG. 4 depicts a view from above of the marking means of FIG. 3, when these means are placed in the mold element.
Figure 15:
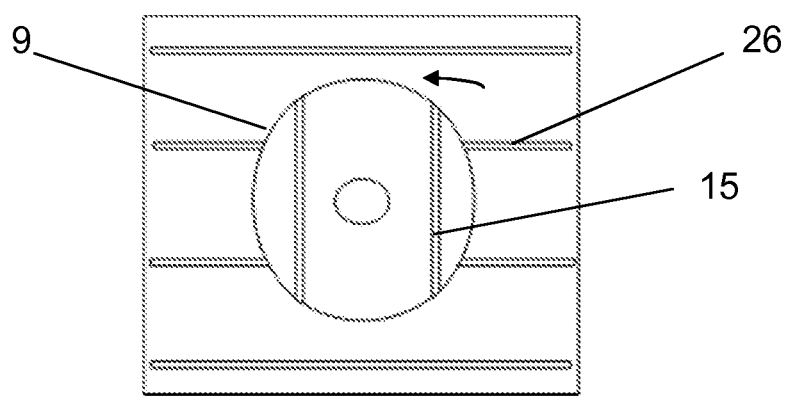
FIG. 15 depicts a step of positioning the insert of FIG. 1 with respect to the rest of the mold element.

In an additional step visible in FIG. 15, by rotating the marking means 9 relative to the insert body, the protrusions 15 are positioned with respect to interrupted sipe blades 26 of the mold element in such a way that these protrusions 15 extend these sipe blades 26, as can be seen for example in FIG. 4.

In a final step (not depicted), the marking means 9 are fixed relative to the insert body 6 by tightening the nut 11C onto the rod 7.

It will be noted that by making the sipe blades more rigid, the thermoplastic material improves the quality of cutting of the sipe blades present in the drilling zone. This then makes it easier to position the protrusions 15 with respect to the interrupted sipe blades 26.

It will also be noted that the height and/or thickness of the protrusions 15 may differ from the height and/or thickness of the interrupted sipe blades 26. For example, it is possible for the height of these protrusions 15 to be smaller than the height of the interrupted sipe blades 26 so as to maintain a high void ratio near the stud while at the same time avoiding excessive softening of the rubber, as so doing could encourage this stud to detach itself from the tire.

The invention is not restricted to the examples described and depicted and various modifications can be made thereto without departing from its scope.

Thus, rather than screwing the insert body into the housing, it is possible for this insert body to be a push fit.

In addition, the marking means 9 have been depicted as a plate that is globally cylindrical exactly extending the insert body 6. As an alternative, it is possible to widen the diameter of these marking means so that they extend beyond the dimensions of the insert body.

Finally, FIG. 3 depicts two protrusions in parallel on the marking means. It is entirely possible to plan a different layout of these protrusions, for example to plan for these protrusions to cross.

The invention claimed is:

1. A mold element for vulcanizing all or part of a tire tread intended to accept studs for driving on ice, the mold element comprising:

a molding surface able to mold all or part of the tread surface of this tread, the said mold element comprising an insert added into the mold element, the insert comprising:

an insert body adapted to be fixed into the mold element;

a rod adapted for molding into the tread a cavity that is capable of accepting a stud, this rod being fixed removably to the insert body;

marking means able to mold a pattern on the tread near the stud;

wherein the marking means are fixed removably to the insert body by a fixing means.

2. The mold element according to claim 1, wherein the fixing means comprises a limit stop secured to the rod.

3. The mold element according to claim 1, wherein the marking means comprises a marking surface that is planar overall, and at least one protrusion projecting from this marking surface, the protrusion being adapted to mold a recess in the tread.

4. The mold element according to claim 3, further comprising sipe blades adapted to mold sipes in the tread surface of the tread, the sipe blades being evenly distributed and projecting from the molding surface of the mold element, wherein a plurality of the sipe blades are interrupted in the region of the insert, wherein the protrusion of the marking means has the shape of a portion of a sipe blade, the portion at least partially extending one of the sipe blades that is interrupted in the region of the insert.

5. The mold element according to claim 3, wherein the protrusion comprises a distal end of the marking surface, this end forming a widening relative to the rest of the protrusion.

6. The mold element according to claim 3, wherein the marking means comprises an opening through which the rod of the insert can pass, the opening having a maximum dimension DO, wherein the position of the protrusion and the dimensions of this protrusion are determined so that the volume of protrusion present in a radius between D0/2 and D0/2+2 mm around the opening, is less than or equal to 20 mm$^3$, and wherein the volume of protrusion present in a radius between D0/2+2 mm and D0/2+4 mm around the opening, is greater than or equal to 60 mm$^3$ and less than or equal to 100 mm$^3$.

7. The mold element according to claim 6, wherein the maximum height Hmax of the protrusion is less than or equal to HA/2, where HA is the height of the rod when this rod is placed in the insert.

8. The mold element according to claim 3, wherein the marking means comprises a set of protrusions which globally form a ring around the rod.

9. The mold element according to claim 3, wherein the marking surface comprises a plurality of holes uniformly distributed over this marking surface at a density at least equal to 5 holes per square millimeter (mm2), the cross section of the holes being between 0.003 mm$^2$ and 0.06 mm$^2$.

10. The mold element according to claim 3, wherein the marking surface comprises a plurality of striations extending into the depth of the marking means, these striations being evenly distributed on the marking surface at a spacing at most equal to 0.5 mm, the striations having a width between 0.03 mm and 0.5 mm.

11. A mold comprising a plurality of mold elements according to claim 1.

12. A method for producing a mold element for vulcanizing all or part of a tire tread adapted to accept studs for driving on ice, the mold element comprising a molding surface able to mold all or part of the tread surface of this tread, comprising:

fixing an insert body into the mold element, wherein the insert body is able to accept a rod adapted to mold in the tread a cavity for accommodating a stud;

fixing marking means with the insert body, these marking means being adapted to mold a pattern on the tread surface of the tread near the stud.

13. The method according to claim 12, wherein the mold element comprises sipe blades intended to mold sipes in the tread surface of the tread, the sipe blades being evenly distributed and projecting from the molding surface of the mold element, a plurality of the sipe blades being interrupted in the region of the insert body, wherein the marking means comprises a marking surface that is planar overall and at least one protrusion projecting from this marking surface, the protrusion having the shape of a sipe blade portion, the method further comprising positioning this protrusion relative to the mold element in such a way that this protrusion at least partially extends one of the sipe blades that is interrupted in the region of the insert body.

14. The method according to claim 12, further comprising, prior to the step of fixing the insert body, producing a housing intended to accept the insert body by removing material in a zone of the mold element comprising sipe blades, the production of this housing involving the removal of all or part of these sipe blades, wherein, prior to the step of producing this housing, a thermoplastic material is applied to the molding surface of the mold element between the sipe blades of the zone of the mold element, the thermoplastic material being able to harden as it cools so as to make the said sipe blades more rigid in order to make them easier to remove in full or in part when producing the housing.

* * * * *